United States Patent
Dai et al.

(10) Patent No.: US 12,177,284 B2
(45) Date of Patent: Dec. 24, 2024

(54) CONTENT DELIVERY NETWORK (CDN) SELECTION USING PERFORMANCE METRIC

(71) Applicant: Hulu, LLC, Santa Monica, CA (US)

(72) Inventors: Tongyu Dai, Beijing (CN); Deliang Fu, Beijing (CN); Si Chen, Beijing (CN); Lemei Huang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/822,053

(22) Filed: Aug. 24, 2022

(65) Prior Publication Data

US 2024/0031420 A1 Jan. 25, 2024

Related U.S. Application Data

(63) Continuation of application No. PCT/CN2022/107669, filed on Jul. 25, 2022.

(51) Int. Cl.
*H04L 65/1089* (2022.01)
*H04L 65/80* (2022.01)

(52) U.S. Cl.
CPC .......... *H04L 65/80* (2013.01); *H04L 65/1089* (2013.01)

(58) Field of Classification Search
CPC ................ H04L 65/80; H04L 65/1089
See application file for complete search history.

(56) References Cited

U.S. PATENT DOCUMENTS

| | | |
|---|---|---|
| 5,646,676 A | 7/1997 | Dewkett et al. |
| 5,684,963 A | 11/1997 | Clement |
| 6,205,477 B1 | 3/2001 | Johnson et al. |
| 6,591,383 B1 | 7/2003 | Michel et al. |
| 7,742,485 B2 | 6/2010 | Zhang |
| 7,895,445 B1 | 2/2011 | Albanese et al. |
| 8,117,306 B1 | 2/2012 | Baumback et al. |
| 8,169,916 B1 | 5/2012 | Pai et al. |

(Continued)

FOREIGN PATENT DOCUMENTS

| | | |
|---|---|---|
| CN | 103546477 A | 1/2014 |
| CN | 103368940 B | 4/2017 |

(Continued)

OTHER PUBLICATIONS

European Office Action, dated Jun. 13, 2023, Application No. 22150150.5, 2 pages.

(Continued)

*Primary Examiner* — Suraj M Joshi

(74) *Attorney, Agent, or Firm* — Kwan & Olynick LLP

(57) ABSTRACT

In some embodiments, a method receives a request for an instance of media content in a current session. A state is retrieved for content delivery networks that is determined for a session in a set of sessions. The state includes a first set of values for a performance metric, and the first set of values is associated with the content delivery networks. The method determines a second set of values for the performance metric for the current session. The second set of values is associated with the content delivery networks. A content delivery network is selected for the request in the current session based on treating the current session as a session in the set of sessions. The session for the current session is after the session for the state in the set of sessions.

20 Claims, 8 Drawing Sheets

(56) References Cited

U.S. PATENT DOCUMENTS

| | | |
|---|---|---|
| 8,276,180 B1 | 9/2012 | Slavenburg et al. |
| 8,370,208 B1 | 2/2013 | Gupta et al. |
| 8,438,393 B2 | 5/2013 | Zhang |
| 8,707,375 B2 | 4/2014 | Hainline |
| 8,843,972 B2 | 9/2014 | Calisa et al. |
| 9,078,020 B2 | 7/2015 | Buehl et al. |
| 9,204,103 B1 | 12/2015 | Zhang et al. |
| 9,712,850 B2 | 7/2017 | Buehl et al. |
| 9,986,049 B2 | 5/2018 | Zhao et al. |
| 10,194,210 B2 | 1/2019 | Coudurier et al. |
| 11,082,741 B2 | 8/2021 | Xie et al. |
| 11,496,786 B2 | 11/2022 | She et al. |
| 11,889,140 B2 | 1/2024 | She et al. |
| 2002/0059573 A1 | 5/2002 | Nishio et al. |
| 2004/0226045 A1 | 11/2004 | Nadarajah |
| 2005/0033858 A1 | 2/2005 | Swildens et al. |
| 2006/0168632 A1 | 7/2006 | Honda et al. |
| 2008/0215718 A1 | 9/2008 | Stolorz et al. |
| 2008/0306999 A1 | 12/2008 | Finger et al. |
| 2009/0125393 A1 | 5/2009 | Hwang et al. |
| 2009/0168752 A1 | 7/2009 | Segel |
| 2009/0259611 A1 | 10/2009 | Wang et al. |
| 2010/0036954 A1 | 2/2010 | Sakata et al. |
| 2010/0070603 A1 | 3/2010 | Moss et al. |
| 2010/0202509 A1 | 8/2010 | Thompson et al. |
| 2010/0228819 A1 | 9/2010 | Wei |
| 2011/0019627 A1 | 1/2011 | Krishnaswamy et al. |
| 2011/0078327 A1 | 3/2011 | Li et al. |
| 2011/0196894 A1 | 8/2011 | Farber et al. |
| 2012/0079524 A1 | 3/2012 | Kalidindi et al. |
| 2012/0089843 A1 | 4/2012 | Kato et al. |
| 2012/0297410 A1 | 11/2012 | Lohmar et al. |
| 2013/0013377 A1 | 1/2013 | Kruglick |
| 2013/0013688 A1 | 1/2013 | Wang et al. |
| 2013/0268577 A1 | 10/2013 | Oyman |
| 2014/0089998 A1 | 3/2014 | Buehl et al. |
| 2014/0108671 A1 | 4/2014 | Watson et al. |
| 2014/0149794 A1 | 5/2014 | Shetty et al. |
| 2014/0164584 A1 | 6/2014 | Joe et al. |
| 2014/0181285 A1 | 6/2014 | Stevens et al. |
| 2014/0365613 A1 | 12/2014 | Phillips et al. |
| 2015/0012593 A1 | 1/2015 | Phillips et al. |
| 2015/0264413 A1 | 9/2015 | Buehl et al. |
| 2015/0382057 A1 | 12/2015 | Huang et al. |
| 2016/0234069 A1 | 8/2016 | Coudurier et al. |
| 2016/0337426 A1 | 11/2016 | Shribman et al. |
| 2017/0188059 A1 | 6/2017 | Major |
| 2017/0188072 A1 | 6/2017 | Major et al. |
| 2017/0257287 A1 | 9/2017 | Kim et al. |
| 2018/0084306 A1 | 3/2018 | Hunter |
| 2018/0167486 A1 | 6/2018 | Pacella et al. |
| 2018/0219932 A1 | 8/2018 | Natarajan et al. |
| 2018/0241796 A1 | 8/2018 | Srinivasan et al. |
| 2018/0373580 A1 | 12/2018 | Ertl et al. |
| 2018/0376197 A1 | 12/2018 | Gonzalez |
| 2021/0152882 A1 | 5/2021 | Xie et al. |
| 2022/0182685 A1 | 6/2022 | Dai et al. |
| 2022/0217432 A1 | 7/2022 | She et al. |
| 2022/0303331 A1* | 9/2022 | Svennebring .... H04N 21/44209 |
| 2023/0041976 A1 | 2/2023 | She et al. |
| 2023/0308733 A1 | 9/2023 | Gangakhedkar et al. |
| 2023/0418675 A1 | 12/2023 | Howe et al. |
| 2024/0205473 A1 | 6/2024 | Tian et al. |

FOREIGN PATENT DOCUMENTS

| | | |
|---|---|---|
| CN | 103825837 B | 6/2017 |
| CN | 107251569 A | 10/2017 |
| CN | 107251569 B | 3/2020 |
| EP | 3257233 A1 | 12/2017 |
| EP | 3257233 A4 | 8/2018 |
| EP | 3742706 A1 * | 11/2020 |
| EP | 4027616 A1 | 7/2022 |
| JP | 2012080394 A | 4/2012 |
| JP | 2020127130 A | 8/2020 |
| KR | 20100054661 A | 5/2010 |
| KR | 20220059425 A | 5/2022 |
| WO | 2014062581 A2 | 4/2014 |
| WO | 2022034619 A1 | 2/2022 |
| WO | 2022107669 A1 | 5/2022 |

OTHER PUBLICATIONS

U.S. Appl. No. 17/937,965, filed Oct. 4, 2022, Qiang She.
Dai et al., "Content Delivery Network (CDN) Selection Using Performance Metric," filed Aug. 24, 2022, U.S. Appl. No. 17/822,053, 45 pages.
Gangakhedkar et al., "System and Method for Delivering Media Content To Users," filed Feb. 13, 2023, U.S. Appl. No. 18/041,535, 54 pages.
Howe et al., "Intelligent Content Delivery Network (CDN) Entity Routing," filed Jun. 27, 2022, U.S. Appl. No. 17/809,246, 42 pages.
International Search Report & Written Opinion dated Nov. 26, 2021, serial No. PCT/IN21/50781, 9 pages.
U.S. Appl. No. 17/809,246, filed Jun. 27, 2922, Thomas Howe.
U.S. Appl. No. 17/822,053, filed Aug. 24, 2022, Tongyu Dai.
U.S. Appl. No. 17/142,982, filed Jan. 6, 2021, Qiang She.
Chinese Application Serial No. 201680009559.8, Office Action dated Jun. 26, 2019, 21 pgs.
European Application No. 22150150.5, Search Report mailed May 27, 2022, 9 pgs.
European Application Serial No. 16749817.9, Office Action dated May 6, 2019, 9 pgs.
Extended European Search Report & Opinion for EP Application 16749817.9, dated Jul. 20, 2018, 9 pages.
International Search Report & Written Opinion for PCT Application PCT/US2016/017380 mailed Jun. 8, 2016, 16 pages.
PID Controller, Wikipedia, Retrieved from the Internet on Jun. 27, 2022: https://en.wikipedia.org/wiki/PID_controller.
European Search Report, Application No. 23184904.3, dated Oct. 25, 2023, 10 pages.
European Extended Search Report, Application No. 23204937.9, Dated Jan. 25, 2024, 11 pages.
Office Action for Japanese Application No. 2023-067009, dated Jun. 4, 2024, 3 pgs., with English translation.
Office Action for Japanese Application No. 2023-067009, dated Sep. 10, 2024, 3 pgs.

* cited by examiner

| Session id | QoS performance on CDN A | QoS performance on CDN B | QoS performance on CDN C |
|---|---|---|---|
| 1 | 0.3 | 0.5 | 0.9 |
| 2 | 1.3 | 0.2 | 0.3 |
| 3 | 0.6 | 0.5 | 1.0 |
| 4 | 0.3 | 0.5 | 0.3 |
| 5 | 0.2 | 0.7 | 0.3 |

FIG. 5

| | ╱─602 | ╱─604 | ╱─606 | ╱─608 | ╱─600 |
|---|---|---|---|---|---|
| step-back state ID | $F(S_A - 1, S_B, S_C)$ | $F(S_A, S_B - 1, S_C)$ | $F(S_A, S_B, S_C - 1)$ | | ╱─609 |
| 1 | 2.6  620 | 3.7  624 | 3.3  628 | |
| 2 | 3.2 | 3.3 | 3.6 | |
| 3 | 2.9 | 3.5 | 3.4 | |

| ╱─612 | ╱─614 | ╱─616 | ╱─618 |
|---|---|---|---|
| Session ID | QoS performance on CDN A ($x_A$) | QoS performance on CDN B ($x_B$) | QoS performance on CDN C ($x_C$) |
| 1 | 0.2  622 | 0.4  626 | 0.7  630 |
| 2 | 0.3 | 0.5 | 0.6 |
| 3 | 0.4 | 0.6 | 0.5 |
| 4 | 1.4 | 0.2 | 0.2 |

FIG. 6B

CONTENT DELIVERY NETWORK (CDN) SELECTION USING PERFORMANCE METRIC

CROSS-REFERENCE TO RELATED APPLICATIONS

This application is a continuation of, and claims priority to, co-pending International Application No. PCT/CN2022/107669 by DAI et al., titled CONTENT DELIVERY NETWORK (CDN) SELECTION USING PERFORMANCE METRIC, filed on Jul. 25, 2022, which is hereby incorporated by reference in its entirety and for all purposes.

BACKGROUND

A video delivery system may use multiple content delivery networks (CDNs) to deliver videos to clients. When a client requests a video, the video delivery system may select one of the content delivery networks to process the request during a playback session. Upon selecting the content delivery network, the client communicates with that content delivery network to stream the video.

Different content delivery networks may provide different quality of service (QoS) to different clients. Accordingly, the content delivery network that is assigned to a client may impact the playback experience during the playback session. For example, a first content delivery network may provide a first quality of service and a second content delivery network may provide a second quality of service to the client to play back the video. When the first quality of service and the second quality of service playback experiences are different, it may be desirable for the video delivery system to assign the content delivery network that may result in a higher quality of service to the playback session for the video, however, using random selection, the video delivery system may not optimally assign content delivery networks to requests for videos.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions.

In the accompanying drawings:

FIG. 5 depicts a table for the QoS performance of these five sessions on content delivery networks according to some embodiments.

FIG. 6A depicts an example of step back states in a table according to some embodiments.

FIG. 6B depicts a table that shows the QoS performance for respective content delivery networks according to some embodiments.

DETAILED DESCRIPTION

Figure 1:
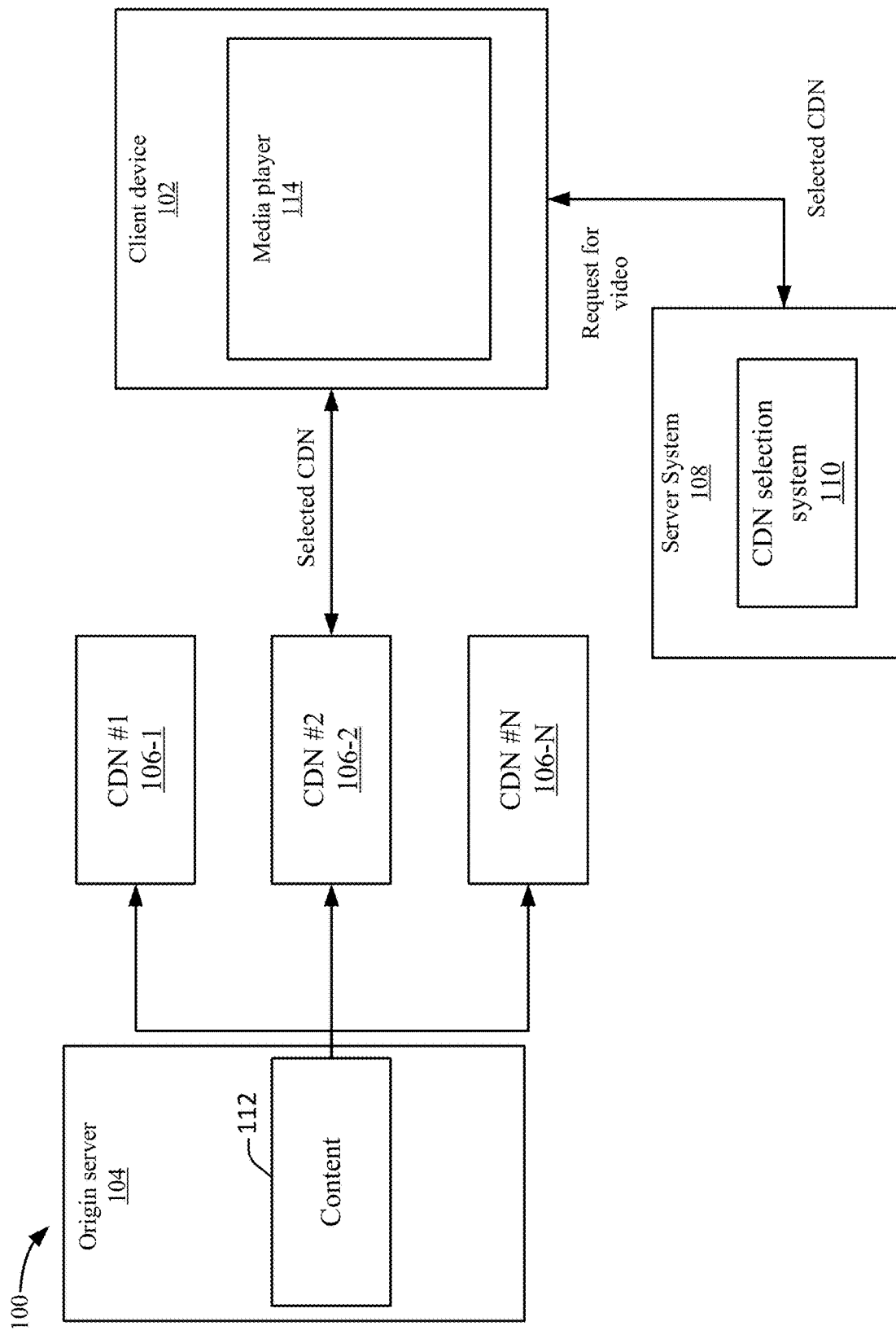
FIG. 1 depicts a simplified system for selecting a content delivery network (CDN) according to some embodiments.

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system may select a content delivery network to assign to a request for media content. The selection may be based on a performance metric that measures a performance of the delivery of instances of media content for multiple content delivery networks. For example, the performance metric may be a quality of service (QoS) performance metric, but other metrics may be used.

In some embodiments, the system may include a restriction for selecting content delivery networks for requests. In some embodiments, the restriction is based on an allocation for the content delivery networks. For example, a video delivery system may have a configuration that sets restrictions on a proportion of requests that are allocated to each content delivery network. This may be due to contractual obligations to the CDNs or other reasons. In some examples, a simple proportion may be 30% of requests should be allocated to a content delivery network #1, 40% of requests should be allocated to a content delivery network #2, 20% requests should be allocated to a content delivery network #3, and 10% of requests should be allocated to a content delivery network #4.

The system may adjust the selection of content delivery networks based on optimizing a performance metric, such as attaining a maximum overall performance metric, while still considering the restriction of the allocation. The overall performance metric may be based on a maximum value of a performance metric of all sessions under a specific allocation, such as a maximum value of a sum of a performance metric of all sessions under a specific allocation. The system may process historical data, such as a batch of sessions that each allocated a content delivery network to a request, to determine what would have been an optimal performance for those sessions. In the processing, the optimal performance may also meet a desired allocation. That is, given an allocation of 30% to a content delivery network #1, 40% to a content delivery network #2, 20% to a content delivery network #3, and 10% to a content delivery network #4, the system allocates requests to the sessions to obtain the optimal performance. The maximum overall performance metric is obtained while honoring the above allocation. Then, the process may save an intermediate state, referred to as "step back state", that represents an overall performance metric for the requests prior to the request associated with the step back state and the step back state (e.g., the overall performance prior to the last request in the batch). Then, the system selects a content delivery network for a current request based on the intermediate state, which treats the current request as the request after the step back state (e.g., the last request in the batch). The intermediate state is used because the state represents the optimal performance for allocating the requests to meet the allocation up until the last request in the batch. To make the selection, the content delivery networks may be assigned values for the performance metric for the current request. If the intermediate state represents the optimal performance that can be achieved to meet the allocation, then the process selects the content delivery network for the request to optimize the overall performance using the intermediate state and the current values for the performance metric. For example, the system selects the content delivery network with the optimal overall performance considering the intermediate state and the current values for the performance metric. As will be described below, the process may select a content delivery network based on the desired allocation while optimizing the overall performance metric of the batch of sessions.

The use of the intermediate state may improve the process of selecting the content delivery networks. For example, the process may be performed faster and less storage may be used because the intermediate state is used instead of reprocessing the batch of sessions for future requests as will be described below. Additionally, an improved selection of content delivery networks is performed by optimizing the overall value of the performance metric while still considering the allocation. The optimization based on overall performance may be an improvement over prior techniques that may not have considered performance of content delivery networks. Also, the selection of a content delivery network is made deterministically based on the intermediate state from prior sessions. This type of selection may also be different from altering a selection probability that is used to select a content delivery network randomly. The optimization of the performance metric may result in better quality of experience at clients that receive the media content.

System Overview

FIG. 1 depicts a simplified system 100 for selecting a content delivery network 106 according to some embodiments. System 100 includes content delivery networks (CDNs) 106-1 to 106-N, a client 102, an origin server 104, and a server system 108. A content provider may operate server system 108 to provide a video delivery service that allows entities to request and receive media content from a library of media content, such as on-demand videos and live videos. The content provider may use server system 108 to coordinate the distribution of media content to clients 102. The media content may include different types of content, such as video, audio, or other types of content information that can be rendered on computing devices. Video may be used for discussion purposes, but other types of content may be appreciated. An instance of media content may be an instance that is requested for a request. For example, a first instance of media content may be for a first show, and a second instance of media content may be for a second show, a third instance may be for the first show, etc.

Content delivery networks 106 may deliver instances of media content for the video delivery service. Content delivery networks 106 may include one or more computing devices, such as servers, that deliver instances of media content to client 102. A content provider may operate its own content delivery network, in addition to contracting with multiple third-party content delivery networks to assist in the delivery of its media content to clients 102. Although an instance of client 102 is shown, content delivery networks 106 may be delivering media content to one or more instances of clients 102. Also, content delivery network 106 may include multiple computing devices, such as edge nodes, which may be geographically distributed. The edge nodes may receive segments of the media content from origin server 104 and deliver the segments to different clients 102. Any server associated with content delivery network 106 may perform the functions described herein. Also, although a server system 108 and content delivery networks 106 may be described, functions performed by either may be distributed between the two entities, or performed by other entities.

Client 102 may include a computing device, such as a smartphone, set top box, tablet device, living room device, gaming console, etc. Client 102 includes a media player 114 that can play the content. Client 102 may use one of the content delivery networks 106, such as a content delivery network #2, to begin playing an instance of media content with media player 114.

Server system 108 may process a request for an instance of media content from client 102. Although not shown, server system 108 may be processing requests from multiple clients 102, both sequentially and concurrently. For example, clients 102 may be using a video delivery service to request videos concurrently or within a time period.

Origin server 104 may store representations of media content in storage 112. The representations may include different playback characteristics for the content, such as different representations of media content that were encoded at different bitrates or quality (e.g., resolutions). For example, a video may be encoded at different bitrates. In some examples, client 102 may be able to request an instance of media content from each content delivery network 106 and each content delivery network 106 may independently be able to respond with a representation of the instance of media content. For example, each content delivery network 106 may include one or more servers that can request and receive the representations of media content from origin server 104. Then, each content delivery network 106 can deliver an instance of media content to client 102.

Server system 108 is configured to select one of content delivery networks 106 to process the requests for instances of media content. A content delivery network (CDN) selection system 110 may select the content delivery network for the request and provide selection data representing the selection of a content delivery network 106 to client 102. The selection data may be provided to the selected content delivery network 106, either in addition to or instead of providing it to client 102. Client 102 may then interact with the selected content delivery network 106, such as content delivery network #2 106-2, to request segments of the instance of media content. Content delivery network #2 106-2 may then deliver the segments to client 102, which displays the segments on media player 114.

Clients 102 may experience different playback conditions during playback of instances of media content. For example, the playback conditions may differ for each content delivery network 106. This may result in instances of media content being delivered to clients 102 at different values of a performance metric. A performance metric may be referred to as quality of service, which may be the measurement of the overall performance of the service of delivering instances of media content from content delivery networks 106 to clients 102. Some metrics that may be used to measure the quality of service performance metric may be related to the network performance, such as packet loss, bitrate, throughput, transmission delay, network availability, jitter, etc. The performance metric may be based on one or more metrics.

A CDN selection system 110 may select a content delivery network 106 for a request based on a selection process. For example, CDN selection system 110 may use an analysis of a performance metric for content delivery networks 106 to select a content delivery network 106 for a request, which will be described in more detail below. In some embodiments, CDN selection system 110 may perform the selection in real time upon receiving a request for an instance of media content. That is, CDN selection system 110 receives a request for an instance of media content (e.g., a program), and selects one of content delivery networks #1 to #N. Then, CDN selection system 110 may send the identification of the selected content delivery network to client 102, which may then request the instance of media content from that selected content delivery network 106. Other methods for communicating the selection of content delivery network 106 for a request may also be appreciated. For example, CDN selection system 110 may send the request to the selected content delivery network 106, which may then communicate with client 102. The selection process will be described in more detail below starting in FIG. 2.

Upon the delivery of the instance of media content from the selected content delivery network 106 to client 102, a performance metric may be measured. The measurement of a performance metric may be performed using different methods, such as clients 102 may send information that is used to measure a performance metric, content delivery networks 106 may send the information, etc. For example, if throughput is being used, then the bytes of an instance of media content that is being delivered over a time period may be collected. Thereafter, a performance metric based on the throughput may be used for selecting a content delivery network 106 for subsequent requests for media content from this client 102 or other clients 102. If only throughput is being used for the performance metric, then CDN selection system 110 may optimize overall throughput. If other performance metrics are being used, CDN selection system 110 may optimize a combination of the performance metrics.

The following will describe a selection process that may select a content delivery network 106 by optimizing a performance metric, such as an overall performance metric. The term QoS performance may be used for discussion purposes, but QoS performance may be interchanged with different performance metrics. The selection process may use a restriction, such as a restriction based on an allocation for content delivery networks 106. An allocation may designate a desired distribution of requests that should be processed by content delivery networks 106 in a time period. For example, an allocation may be a proportion, percentage, etc. The allocation may be based on how many requests content delivery networks 106 should process over time based on different factors, such as agreed upon percentages with content delivery networks 106. In some examples, an allocation may be 11:12:17 where a content delivery network A should be allocated 11 requests in a time period, a content delivery network B should be allocated 12 requests in the time period, and a content delivery network C should be allocated 17 requests in the time period. CDN selection system 110 uses a selection process that optimizes overall QoS performance in the selection of content delivery networks 106 for requests while considering the allocation. The overall QoS performance may be based on optimizing QoS performance over multiple sessions as opposed to one session. As will be described below, the allocation of a content delivery network 106 attempts to minimize drift from the desired allocation while optimizing overall QoS performance. Drift may be where the total allocation of content delivery networks to requests may not adhere to the desired allocation over a time period. The drift minimization and overall QoS performance optimization may be achieved by determining step back states for a batch of sessions that optimize the overall QoS performance, and treating a current session as the last session in the batch. The step back states represent an overall performance metric for requests prior to the last request in the batch of sessions while following the desired allocation. The selection process then selects a content delivery network based on the step back states and the current predicted QoS performance for the current session. The selected content delivery network optimizes the overall QoS performance. Also, the drift may be minimized over time to as a factor of the number of sessions that are used. For example, the drift is limited because the overall QoS performance value for the step back state is for the adjacent state to the desired allocation. If the batch size of 100 sessions is used, and the step back state is for the first 99 sessions, a drift of around 1% (e.g., 1 out of 100) may be experienced when the current session is treated as the 100th session. When the batch size is 1000 sessions, and the step back state is for the first 999 sessions, the drift may be around 0.1%. This process will now be described in more detail.

CDN Selection System

Figure 2:
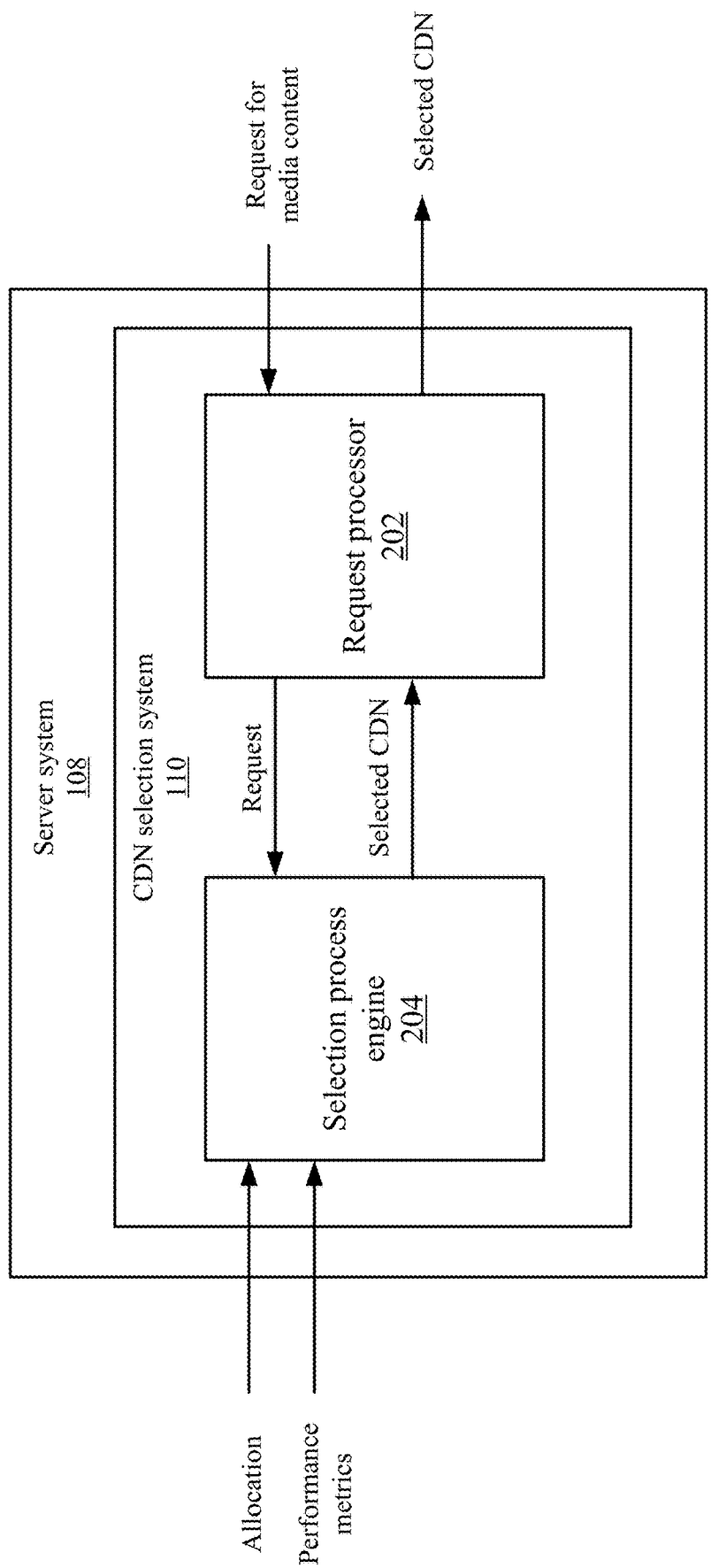
FIG. 2 depicts a more detailed example of a CDN selection system according to some embodiments.

FIG. 2 depicts a more detailed example of CDN selection system 110 according to some embodiments. A request processor 202 receives a request for an instance of media content from client 102. Although not shown, request processor 202 may be receiving multiple requests for instances of media content from multiple clients 102. The requests may be for different media content, or the same media content. For example, a first request is for a first program, a second request is for a second program, and a third request is for the first program.

A selection process engine 204 may select a content delivery network for a request. Once selecting the content delivery network 106, request processor 202 may return the selected content delivery network 106 to client 102. To perform the selection process, selection process engine 204 receives an allocation and values for a performance metric for content delivery networks. The values may be predicted values for the performance of content delivery networks in the current session. Based on the allocation and values for the respective performance metric, selection process engine 204 selects a content delivery network 106 for the request that optimizes overall performance. In some embodiments, the allocation may not change over a period of time. That is, the allocation may not be changed over multiple selections of content delivery networks 106. The allocation may be changed at some points, but the allocations may not be changed while the selection process runs for X requests. The performance metrics may change as different metrics are received from content delivery networks 106 that are delivering media content to clients 102.

The following will now describe the selection process in more detail. CDN selection system 110 may attempt to optimize QoS performance, such as to maximize the overall QoS performance, as an optimization goal while considering the restriction of the allocation as a condition. In some embodiments, the process optimizes the overall QoS performance while attempting to meet the allocation. The following will use an example, but other examples may be appreciated. In the example, three content delivery networks 106 may be used, which are referred to as content delivery network A, content delivery network B, and content delivery network C, but other numbers of content delivery networks 106 may be used.

Figure 3:
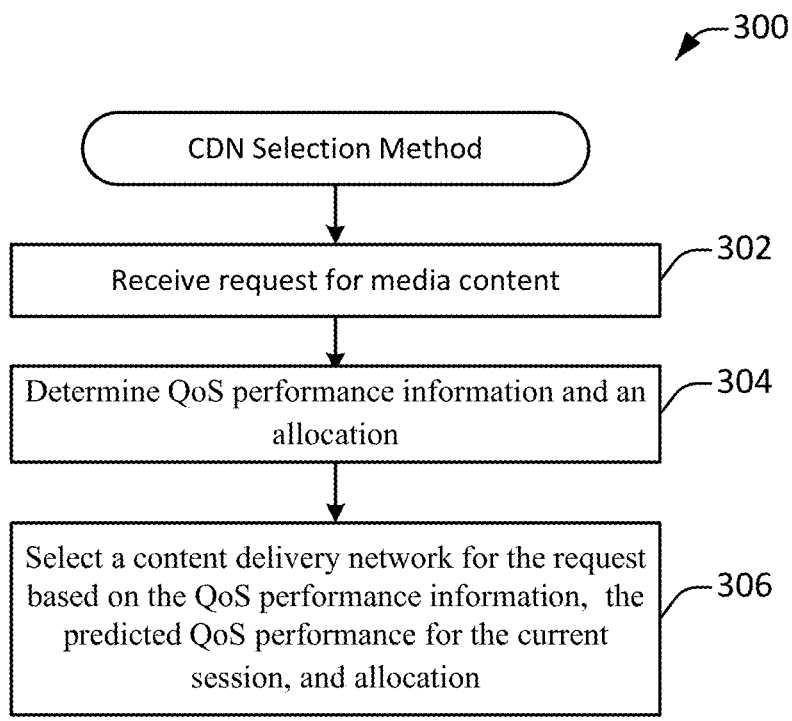
FIG. 3 depicts a simplified flowchart of a method for selecting a content delivery network according to some embodiments.

FIG. 3 depicts a simplified flowchart 300 of a method for selecting a content delivery network 106 according to some embodiments. At 302, CDN selection system 110 receives a request for media content from a client 102 in a current playback session. As discussed above, the selection of a content delivery network 106 may be performed dynamically upon receiving a request. A session may be where a request is received and playback of an instance of media content is performed.

At 304, CDN selection system 110 determines QoS performance information and also an allocation for distributing requests to content delivery networks 106. The QoS performance information may be determined from historical information of playback sessions. Also, the QoS information may be predicted QoS performance information for the current session. The predicted QoS information may be determined in different ways, such as based on past performance. The determination of the QoS performance information will be described in more detail below in FIG. 4.

At 306, CDN selection system 110 selects a content delivery network 106 for the request based on the QoS performance information, the predicted QoS performance for the current session, and the allocation. As will be discussed below in FIG. 4, the selection attempts to optimize overall QoS performance while minimizing drift from the allocation.

Figure 4:
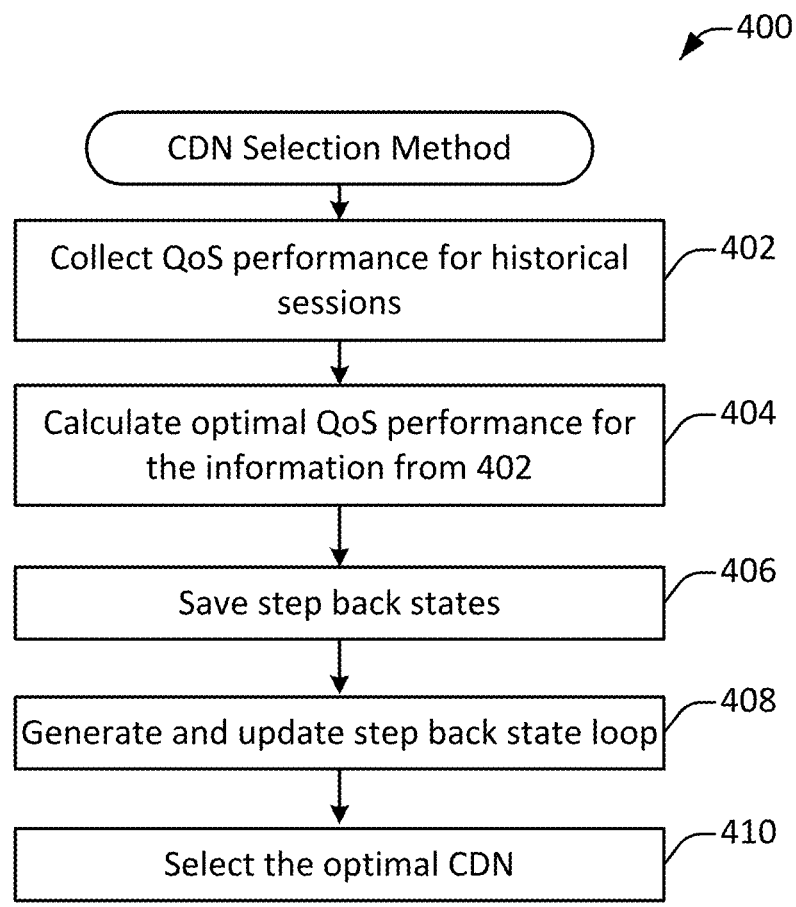
FIG. 4 depicts a simplified flowchart of a more detailed method for selecting a content delivery network according to some embodiments.

FIG. 4 depicts a flowchart 400 of a more detailed method for selecting a content delivery network 106 according to some embodiments. At 402, CDN selection system 110 collects QoS performance information for a batch of historical sessions. The number of sessions that may be used may vary, such as 100 sessions, 150 sessions, etc. may be used. Also, the number of sessions may be within a time period, such as the last 24 hours.

At 404, CDN selection system 110 calculates an optimal performance for the QoS performance information received in 402. For example, for the sessions received at 402, CDN selection system 110 may optimize an overall QoS performance for selecting content delivery networks 106 as an optimization goal for the sessions. CDN selection system 110 performs the QoS performance optimization using a condition, where the limiting condition is the allocation restriction configured for each content delivery network 106. The following will describe an example of the optimization process. In this example, there are three content delivery networks 106 named as content delivery network A, content delivery network B and content delivery network C, and the QoS performance of any one session on these three content delivery networks are ($p_A$, $p_B$, $p_C$) respectively. Different methods may be used to determine the QoS performance values. In some embodiments, the QoS performance values may be predicted from the historical sessions. That is, the historical information may be used to predict the QoS that may have resulted for each content delivery network in a session if that content delivery network processed a request. Other methods of determining the QoS performance values may also be appreciated, such as using interpolation based on the historical information. If the total session count on these content delivery networks is $S_A$, $S_B$ and $S_C$, CDN selection system 110 can calculate the sum of their QoS performance as $P_A$, $P_B$, and $P_C$, respectively. In the configuration, the allocation proportion of these content delivery networks is $T_A:T_B:T_C$. Therefore, in this case, the optimization goal is 'max($P_A+P_B+P_C$)' while the limiting restriction is '$S_A:S_B:S_C=T_A:T_B:T_C$'. This means the maximum overall QoS performance is determined based on the restriction of the selected content delivery networks for the sessions equaling the allocation proportion. In some embodiments, the selection process can be represented as follows:

$$F = \max(P_A + P_B + P_C)$$
$$\text{s.t. } P_A = \sum_{S_A} p_A$$
$$P_B = \sum_{S_B} p_B$$
$$P_C = \sum_{S_C} p_C$$
$$S_A:S_B:S_C = T_A:T_B:T_C$$

The function F may be the sum of the terms (s.t.) of the overall QoS performance of the content delivery networks with the limiting restriction being met. In the above, CDN selection system 110 uses 'max($P_A+P_B+P_C$)' as the optimization goal, wherein max is a maximum function and P is the overall QoS performance for respective content delivery networks. The overall value may represent a cumulative representation of QoS performance over a number of sessions, such as a sum of QoS performance. CDN selection system 110 uses a state function F(i, j, k) to save intermediate results, which represents the maximum overall QoS performance when the traffic on content delivery networks A, B and C is i, j and k respectively. The values of i, j and k are how many sessions have been allocated on respective content delivery networks A, B, and C. For example, the state function F(2, 1, 3) includes the values i=2, j=1, and k=3. Here, two requests have been allocated to content delivery network A, one request has been allocated to content delivery network B, and three requests have been allocated to content delivery network C. The state function F(i, j, k) represents the optimal value (e.g., the maximum value for this performance metric) of the overall QoS performance of all sessions under the specific allocation defined by i, j and k. That is, the state function represents the optimal value of the overall QoS performance when CDN selection system 110 allocates two sessions on content delivery network A, one session on content delivery network B, and three sessions on content delivery network C. Therefore, the state function also represents the optimal overall QoS performance that can be obtained under the allocation restriction (2, 1, 3).

To select a content delivery network 106 for a current session, CDN selection system 110 uses a state transition function. For example, CDN selection system 110 uses the following state transition function to calculate the optimal overall performance for F($S_A$, $S_B$, $S_C$):

$$F(i,j,k)=\max\{F(i-1,j,k)+p_A, F(i,j-1,k)+p_B, F(i,j,k-1)+p_C\}.$$

The state transition function describes a relationship between different (adjacent) state functions. In the example with 3 content delivery networks, the state function F(i, j, k) is adjacent to the state functions of F(i−1, j, k), F(i, j−1, k) and F(i, j, k−1). That is, if the state function is F(8, 12, 15), the adjacent state functions are F(7, 12, 15), F(8, 11, 15), and F(8, 12, 14). The three state functions subtract one session from the session value of a respective content delivery network. In the state transition function, the prior state is represented by "i−1", "j−1", and "k−1" for content delivery networks A, B, and C, respectively. Each prior state for a respective content delivery network may have a current QoS performance added to it, such as $F(i-1, j, k)+p_A$ for content delivery network A. In this example, F(7, 12, 15) is added to the current QoS performance value $p_A$ for content delivery network A.

CDN selection system 110 uses the state transition function to calculate the optimal overall performance $F(S_A, S_B, S_C)$ of this batch of playback sessions. For example, in the process of generating a value for the state function $F(S_A, S_B, S_C)$, CDN selection system 110 starts from F(0, 0, 0). Then, based on F(0, 0, 0), the results of F(1, 0, 0), F(0, 1, 0) and F(0, 0, 1) are determined using the state transition function. At the end of the process, $F(S_A, S_B, S_C)$ will be finally determined from the prior states, which are $F(S_A-1, S_B, S_C)$, $F(S_A, S_B-1, S_C)$ and $F(S_A, S_B, S_C-1)$.

The following describes an example to show the use of the state transition function to determine the optimal overall QoS performance of the batch of playback sessions. Five sessions will be used for discussion purposes, but the number of sessions may vary. For the three content delivery networks A, B, and C, the configuration of the allocation proportion on these content delivery networks is $T_A:T_B:T_C=1:2:2$. That is, out of five requests, content delivery network A should be allocated one request, content delivery network B should be allocated two requests, and content delivery network C should be allocated two requests. Accordingly, the final session count is expected to be $S_A:S_B:S_C$ 1:2:2, which means that the state function $F(S_A, S_B, S_C)$=F(1, 2, 2) is the final target.

FIG. 5 depicts a table 500 for the QoS performance of the five sessions on content delivery networks according to some embodiments. Table 500 lists sessions identifiers in a column 502 for the five sessions. The QoS performance for each session is listed for content delivery networks A, B, and C in columns 504, 506, and 508. The QoS performance may be predicted performance based on the historical information. For this QoS performance metric, a lower the value for QoS performance represents a lower QoS performance while a higher value represents a higher QoS performance. For example, an optimal performance metric based on throughput may have a higher value, and an optimal performance metric based on rebuffer ratio may be lower. This is because higher throughput is considered better and fewer rebuffer occurrences are considered better. The following uses a maximum function to determine the optimal overall QoS performance; however, the determination of the optimal overall QoS performance may use other functions, such as a minimum function may be used when the total desired should be lower in the case of rebuffer ratio. In this example, in session #1, content delivery network A had a 0.3 QoS performance, content delivery network B had a 0.5 QoS performance, and content delivery network C had a 0.9 QoS performance. Thus, content delivery network C had the best QoS performance in session #1 if content delivery network C delivered the media content for a request.

To determine the optimal overall QoS performance over the sessions, CDN selection system 110 calculates the maximum overall QoS performance with a target of a state function F(1, 2, 2)→. The following represents a step by step process for calculating a maximum overall QoS performance for each state. The process may calculate each possible state combination to reach the state function of F(1, 2, 2)→. Through the process, the QoS performance for the state function F(1, 2, 2) then represents the maximum overall QoS performance that is possible.

The first state is a state of F(0,0,0)=0, where there have not been any sessions in the batch of sessions allocated on content delivery networks, so the total of QoS performance is 0.

To calculate the state function F(0, 0, 1), the total count of sessions allocated on all content delivery networks is one (e.g., 0+0+1=1) session. In this case, the session to be allocated now is session id=1 because this session has allocated only one session. The state function adjacent to F(0, 0, 1) is only F(0,0,0) because a negative value on the allocation may not allowed (e.g., a −1 session count is not allowed). The state transition of F(0, 0, 1)=F(0,0,0)+0.9=0.9. The term F(0,0,0) is F(0, 0, 1−1=0) to determine the adjacent state for the state transition function. As discussed above, the value of F(0,0,0)=0. Also, 0.9 is the QoS performance for content delivery network C in session 1. This yields an overall QoS performance for this state of 0.9.

To calculate the state function F(0, 0, 2), the session to be allocated now is session id=2 and the adjacent state function is F(0, 0, 1). The value of the state function is: F(0, 0, 2)=F(0, 0, 1)+0.3=0.9+0.3=1.2.

The session count on content delivery network C is limited to be not more than two per the allocation proportion, so CDN selection system 110 does not calculate the state function F(0, 0, 3). A next state function may be F(0, 1, 0). The session to be allocated now is session id=1 again because one session has been allocated, but the session will be allocated on content delivery network B this time. The value of the state function is: F(0, 1, 0)=F(0,0,0)+0.5=0.5=0.0+0.5=0.5. The value of 0.5 is the maximum overall QoS performance for content delivery network B in the session with id=1.

Another state function is F(0, 1, 1). The session to be allocated now is session id=2 again, but there may be two situations. The first is that the session with id=1 is assigned to content delivery network B, and the session with id=2 is assigned to content delivery network C. The other situation is the opposite way of allocation for session 1 (content delivery network C) and session 2 (content delivery network B). So, the adjacent state functions for F(0, 1, 1) are F(0, 1, 0) and F(0, 0, 1). Then, CDN selection system 110 can calculate the state function F(0, 1, 1)=max{F(0, 1, 0)+0.3, F(0, 0, 1)+0.2}=max{0.5+0.3, 0.9+0.2}=max{0.8, 1.1}=1.1. In this case, the values for the state function F(0, 1, 0) is determined from above as 0.5 and the value for the state function F(0, 0, 1) is 0.9 above. The maximum is taken from the two values of 1.1, which represents the maximum overall QoS performance for this state.

To calculate the state function F(0, 1, 2), the session to be allocated now is id=3 because there are three sessions. The adjacent state functions of F(0, 1, 2) are F(0, 1, 1) and F(0, 0, 2). The state function is: F(0, 1, 2)=max{F(0, 1, 1)+1.0, F(0, 0, 2)+0.5}=max{1.1+1.0, 1.2+0.5}=max{2.1, 1.7}=2.1. The value for the state function F(0, 1, 1) is 1.1 from above and the QoS performance in session #3 for content delivery network C is 1.0. Also, the value for the state function F(0, 0, 2) is 1.2 from above and the QoS performance in session #3 for content delivery network B is 0.5. The maximum is taken from the two values of 2.1, which represents the maximum overall QoS performance for this state.

To calculate the state function F(0, 2, 0), the session to be allocated now is id=2 again, but there is only one adjacent state function F(0, 1, 0). So, the processing of the state function is: F(0, 2, 0)=F(0, 1, 0)+0.2=0.5+0.2=0.7. The value for the state function F(0, 1, 0) is 0.5 from above and the value for content delivery network B for session #2 is 0.2. The value of 0.7 is the maximum overall QoS performance for this state.

To calculate the state function F(0, 2, 0), the session to be allocated now is id=2 again, but there is only one adjacent state function F(0, 1, 0). The processing of the state function is: F(0, 2, 1)=max{F(0, 2, 0)+1.0, F(0, 1, 1)+0.5}=max{0.7+1.0, 1.1+0.5}=max{1.7, 1.6}=1.7.

To calculate the state function F(0, 2, 2), the session to be allocated with id=4. There are two adjacent states and the processing of the state function is: F(0, 2, 2)=max{F(0, 2, 1)+0.3, F(0, 1, 2)+0.5}=max{1.7+0.3, 2.1+0.5}=max{2.0, 2.6}=2.6.

The following will describe the processing of other state functions, the processing of which are similar to above. The following state functions are calculated as:

$$F(1,0,0)=F(0,0,0)+0.3=0.3$$

$$F(1,0,1)=\max\{F(1,0,0)+0.3, F(0,0,1)+1.3\}=\max\{0.3+0.3, 0.9+1.3\}=2.2$$

$$F(1,0,2)=\max\{F(1,0,1)+1.0, F(0,0,2)+0.6\}=\max\{2.2+1.0, 1.2+0.6\}=3.2$$

$$F(1,1,0)=\max\{F(1,0,0)+0.2, F(0,1,0)+1.3\}=\max\{0.3+0.2, 0.5+1.3\}=1.8$$

$$F(1,1,1)=\max\{F(1,1,0)+1.0, F(1,0,1)+0.5, F(0,1,1)+0.6\}=\max\{1.8+1.0, 2.2+0.5, 1.1+0.6\}=2.8$$

$$F(1,1,2)=\max\{F(1,1,1)+0.3, F(1,0,2)+0.5, F(0,1,2)+0.3\}=\max\{2.8+0.3, 3.2+0.5, 2.1+0.3\}=3.7$$

$$F(1,2,0)=\max\{F(1,1,0)+0.5, F(0,2,0)+0.6\}=\max\{1.8+0.5, 0.7+0.6\}=2.3$$

$$F(1,2,1)=\max\{F(1,2,0)+0.3, F(1,1,1)+0.5, F(0,2,1)+0.3\}=\max\{2.3+0.3, 2.8+0.5, 1.7+0.3\}=3.3$$

$$F(1,2,2)=\max\{F(1,2,1)+0.3, F(1,1,2)+0.7, F(0,2,2)+0.2\}=\max\{3.3+0.3, 3.7+0.7, 2.6+0.2\}=4.4$$

The values for the state functions may represent the maximum value of the overall QoS performance of the prior sessions for the allocation. For example, for the state function F(1, 2, 2)=max{F(1, 2, 1)+0.3, F(1, 1, 2)+0.7, F(0, 2, 2)+0.2}=max{3.3+0.3, 3.7+0.7, 2.6+0.2}=4.4, the maximum value of the overall QoS performance for the allocation proportion of (1, 2, 2) is 4.4. That is, a selection of content delivery network B for this session would yield the highest overall QoS performance of 4.4, which is greater than 3.6 for content delivery network A and 2.8 for content delivery network C. For each content delivery network, the respective value represents the optimal overall QoS performance from the sessions if that content delivery network is selected for the current session. For example, content delivery network A has a total of 3.6, content delivery network B has a total of 4.4, and content delivery network C has a total of 2.8. These values may represent a quantification of the overall QoS performance from the sessions. As discussed above, the meaning of the value may be based on the performance metric that is being used. Here, a higher value means the QoS performance is higher.

Referring back to FIG. 4, at 406, CDN selection system 110 saves a step back state from the above calculations in 404. CDN selection system 110 saves the values for the desired allocation as a step back state. The step back state is the state before a current session in which a content delivery network should be selected for a request. The value of the step back state may represent the optimal overall QoS performance from the prior sessions. By saving the step back state, the selection of the content delivery network for the current session may be performed faster. For example, the overall QoS performance for the prior sessions does not need to be calculated again to process multiple requests. This decreases the time needed to assign content delivery networks to requests. Also, the step back state represents the optimal overall QoS performance that may be attained from the states before the allocation is reached. Thus, the allocation proportion is followed for those sessions in addition to optimizing QoS performance.

With the optimal overall performance calculated from historical sessions at 404, CDN selection system 110 selects a content delivery network 106 for the received request based on the step back state results. CDN selection system 110 selects the content delivery network for the upcoming session based on the step-back result (e.g., using the functions $F(S_A-1, S_B, S_C)$, $F(S_A, S_B-1, S_C)$ and $F(S_A, S_B, S_C-1)$). To perform the processing, CDN selection system 110 stores the step-back state values that are needed for the selection of the content delivery networks for future requests. Specifically, in the previous example in 406, the step-back state includes $F(S_A-1, S_B, S_C)$=F(0, 2, 2)=2.6, $F(S_A, S_B-1, S_C)$=F(1, 1, 2)=3.7 and $F(S_A, S_B, S_C-1)$=F(1, 2, 1)=3.3. CDN selection system 110 saves a tuple of values for the overall QoS performance of (2.6, 3.7, 3.3) as the step back state for the allocation.

At 408, CDN selection system 110 generates and updates a step back loop. In some embodiments, CDN selection system 110 may need to use more step back states to avoid bias caused by samples in a single group, but in other embodiments, the step back loop may not be used. In some embodiments, CDN selection system 110 may add step back states to create a loop at 408. A loop is a number of step back states that CDN selection system 110 uses to select content delivery networks for requests. CDN selection system 110 may loop through the step back states using a new step back state in the loop for each request that is received. When the end of the loop is reached, CDN selection system 110 loops back to the beginning of the loop to reuse the step back states. For example, CDN selection system 110 may desire to use 200 groups of sessions as step back states (e.g., step back states from 200 groups of 100 sessions each). The above processing at 308 calculated the step back state for one group of 100 sessions. 199 other step back states may also be included in the loop. Bias may be avoided as different step back states in the loop are used to process new requests instead of the same step back state for all the requests.

CDN selection system 110 may form a loop that can change the 100 groups of sessions that are used over time. One of different methods may be used to update the step back state loop. For example, CDN selection system 110 may use a queue, such as a first in/first out (FIFO) queue. When a new step back state is generated, CDN selection system 110 may store the new step back state in the queue and the last step back state, which is at the head of the queue, is dropped. In this way, CDN selection system 110 incrementally updates the step back state in the loop. CDN selection system 110 may also use a one-time update to update the step back states that are used. CDN selection system 110 may accumulate 100 of the latest step back states to form a new loop. Then, CDN selection system 110 directly replaces the prior step back state loop with the new step back states.

After generating the step back state loop, at 410, CDN selection system 110 selects the optimal content delivery network 106 for requests. In some embodiments, CDN selection system 110 may process a single request using the step back state loop before updating the step back state loop. In other embodiments, CDN selection system 110 may process multiple requests using the step back state loop before updating the step back state loop.

To select a content delivery network 106 for a request, CDN selection system 110 may use the state transition function to select a content delivery network 106 that optimizes overall QoS performance. In using the transition function, CDN selection system 110 may use the step back states in the loop and considers the request as the last session of the batch, such as the 100th session out of 100 sessions. That is, CDN selection system 110 uses the transition function to determine a content delivery network 106 for the request based on the request being the 100 session after the prior 99 sessions. For example, CDN selection system 110 selects the content delivery network for the 100th session that has the highest overall QoS performance. If the step back state represents the optimal overall QoS performance for the content delivery networks for the prior sessions, CDN selection system 110 may determine which content delivery network in the current session will result in the highest overall QoS performance. For example, the predicted QoS performance of a content delivery network for the current session may be added to the respective QoS performance for the step back state. The resulting value represents the overall QoS performance of that content delivery network if selected in the current session. By selecting the content delivery network with the highest overall QoS performance (step back state+current QoS), CDN selection system 110 may maximize the overall QoS performance when selecting content delivery networks. The following describes an example of the selection of the content delivery network 106 for requests.

FIG. 6A depicts an example of step back states in table 600 according to some embodiments. Three step back states are shown in this example, but there may be more step back states in the table, such as 200 step back states. At 602, table 600 lists a step back state identifier. In columns 604, 606, and 608, step back states are shown for each step back state identifier for content delivery network A, content delivery network B, and content delivery network C, respectively. As shown at 609, the step back state that was determined at 406 is stored in table 600. The other step back states may have been added to the loop as described above.

There are four sessions for four requests to be allocated in this example. FIG. 6B depicts a table 610 that shows the QoS performance for respective content delivery networks according to some embodiments. A column 612 shows the session identifier. Then, columns 614, 616, and 618 show the QoS performance for content delivery A, content delivery B, and content delivery network C, respectively. The QoS performance may be predicted performance for the content delivery networks for the current session. For example, a model may be trained to predict QoS performance for content delivery networks for a current session or interpolation based on historical sessions may be used.

CDN selection system 110 may select content delivery networks 106 for each session shown in table 610. These sessions may be for requests that are received and processed in order. For example, CDN selection system 110 may receive a request for session 1 and select a content delivery network for session 1. Then, CDN selection system 110 may receive a request for session 2 and select a content delivery network for session 2, and so on. In general, looking at the values for the step back state, the difference in values in the step back states may be used to determine the selection of a content delivery network. In session 1, content delivery network B has a higher QoS performance of 0.4 over content delivery network C (3.7-3.3=0.4). Also, content delivery network B has a higher QoS performance of 1.1 over content delivery network A (3.7-2.6=1.1). Accordingly, to select content delivery network C over content delivery network B, the current QoS performance value for content delivery network C should be 0.4 higher than content delivery network B. Similarly, to select content delivery network A over content delivery network B, the current QoS performance value for content delivery network A should be 1.1 higher than content delivery network B.

For session 1, the step-back state with ID=1 is the step back state that is used for selecting the content delivery network. As discussed above, CDN selection system 110 may use different step back states in the loop to avoid bias. The following calculates the values for selecting a content delivery network using the state transition function (i, j, k)=max$\{F(i-1, j, k)+p_A, F(i, j-1, k)+p_B, F(i, j, k-1)+p_C\}$. The values for the state transition function are: $x_A+F(S_A-1, S_B, S_C)=0.2+0.6=2.8$, $x_B+F(S_A, S_B-1, S_C)=0.4+3.7=4.1$, $x_C+F(S_A, S_B, S_C-1)=0.7+3.3=4.0$. In the first term, the step back state is 2.6 for content delivery network A and shown at 620 in FIG. 6A. Then, the QoS performance for content delivery network A in the current session is 0.2 at 622. Accordingly, the value for the first term of the state transition function is 0.2+2.6=2.8. In the second term, the step back state is 3.7 for content delivery network B and is shown at 624 in FIG. 6A. Then, the QoS performance for content delivery network B in the current session is 0.4 at 626. Accordingly, the value for the second term of the state transition function is 0.4+3.7=4.1. In the third term, the step back state is 3.3 for content delivery network C is shown at 628 in FIG. 6A. Then, the QoS performance for content delivery network C in the current session is 0.7 at 630. Accordingly, the value for the third term of the state transition function is 0.7+3.3=4.0. CDN selection system 110 then determines the largest term by comparing the values that were determined. Here, the values are 2.8, 4.1, and 4.0 for content delivery networks A, B, and C, respectively. Because the second term for content delivery network B, $x_B+F(S_A, S_B-1, S_C)$, is the largest, CDN selection system 110 selects content delivery network B for session 1. The selection of content delivery network B may optimize overall QoS performance because the value for the state transition function is highest. This means that selecting content delivery network B for this request may maximize the overall QoS performance.

For session 2, the step-back state with ID=2 is used for selecting the content delivery network. This is the second step back state in the loop. The values for the state transition function are: $x_A+F(S_A-1, S_B, S_C)=0.3+3.2=3.5$, $x_B+F(S_A, S_B-1, S_C)=0.5+3.3=3.8$, $x_C+F(S_A, S_B, S_C-1)=0.6+3.6=4.2$. Because the third term for content delivery network C, $x_C+F(S_A, S_B, S_C-1)$, is the largest, CDN selection system 110 selects content delivery network C for session 2.

For session 3, the step-back state with ID=3 is used for selecting the content delivery network. The values for the state transition function are: $x_A+F(S_A-1, S_B, S_C)=3.3<x_C+F(S_A, S_B, S_C-1)=3.9<x_B+F(S_A, S_B-1, S_C)=4.1$. Because the second term for content delivery network B, $F(S_A, S_B, S_C-1)$, is the largest, CDN selection system 110 selects content delivery network B for session 3.

For session 4, the step-back state with ID=1 is used again for selecting the content delivery network. This is because the step-back states in the loop are used in turn and the step back state reiterates from session 3 to session 1 in the loop after session 3 is used. The values for the state transition function are: $x_A+F(S_A-1, S_B, S_C)=4.0 > x_B+F(S_A, S_B-1 S_C)$ $3.9 > x_C+F(S_A, S_B, S_C-1)=3.5$. Because the first term for content delivery network A, $x_A+F(S_A-1, S_B, S_C)$, is the largest, CDN selection system 110 selects content delivery network A for session 4. If there are more sessions, then CDN selection system 110 performs similar processing of the step back states and QoS performance values.

CDN selection system 110 may treat the QoS performance of all sessions on content delivery networks 106 as forming a fixed distribution. In the distribution, each session is equivalent and independently distributed. In this case, if any session is replaced in the batch, the results subject to the configured traffic allocation may still be kept because each session is determined independently. For example, over a time period, the QoS performance of a content delivery network obeys its respective probability distribution (for example, Gaussian distribution with mean value of 0.9 and variance of 0.01). Then, for any session, the QoS performance on different CDNs is a sampling in the distribution. If all samples come from a perfect distribution, 100 samples may be selected arbitrarily, and the calculated step back states will be the same. In other words, these samples can be replaced with each other.

CDN selection system 110 selects a content delivery network 106 in a way that provides many advantages. For example, the overall performance of the system may be improved as QoS performance is improved in total. Also, the desired traffic allocation is considered by the selection and drift is minimized.

Compared to the random selection of content delivery networks, the following process considers the optimized overall QoS performance difference between different content delivery networks 106 when selecting a content delivery network. Considering the QoS performance may improve the overall QoS performance, which improves the streaming and user experience if better conditions are provided during the delivery of media content. The selection makes a deterministic selection to improve the overall performance, but also ensures that the overall allocation proportion is considered.

System

Figure 7:
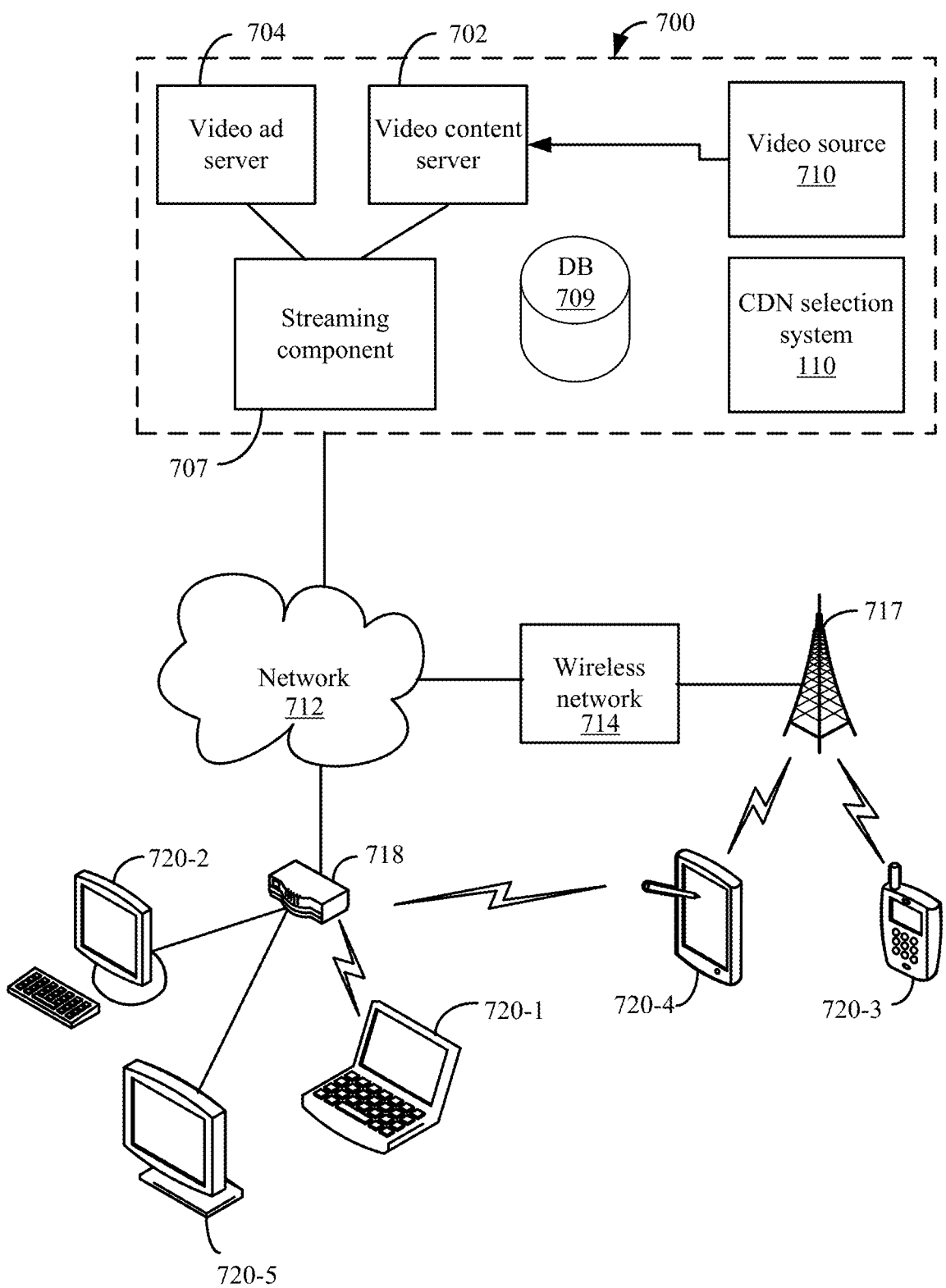
FIG. 7 depicts a video streaming system in communication with multiple clients via one or more communication networks according to one embodiment.

Features and aspects as disclosed herein may be implemented in conjunction with a video streaming system 700 in communication with multiple clients via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include CDN selection system 110.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more clients 720 may be in communication with the video streaming system 700, via the data communication network 712, wireless cellular telecommunications network 714, or another network. Such clients may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such clients 720 may send and receive data or instructions to the system 700, in response to user input received from user input devices or other input. In response, the system 700 may serve video segments and metadata from the data store 709 responsive to selection of media programs to the clients 720. Clients 720 may output the video content from the streaming video segment in a media player using a display screen, projector, or other video output device, and receive user input for interacting with the video content.

Distribution of audio-video data may be implemented from streaming component 707 to remote clients over computer networks, telecommunications networks, and combinations of such networks, using various methods, for example streaming. In streaming, a content server streams audio-video data continuously to a media player component operating at least partly on the client, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client cannot play the video without also playing predetermined advertisements during the designated ad slots.

Figure 8:
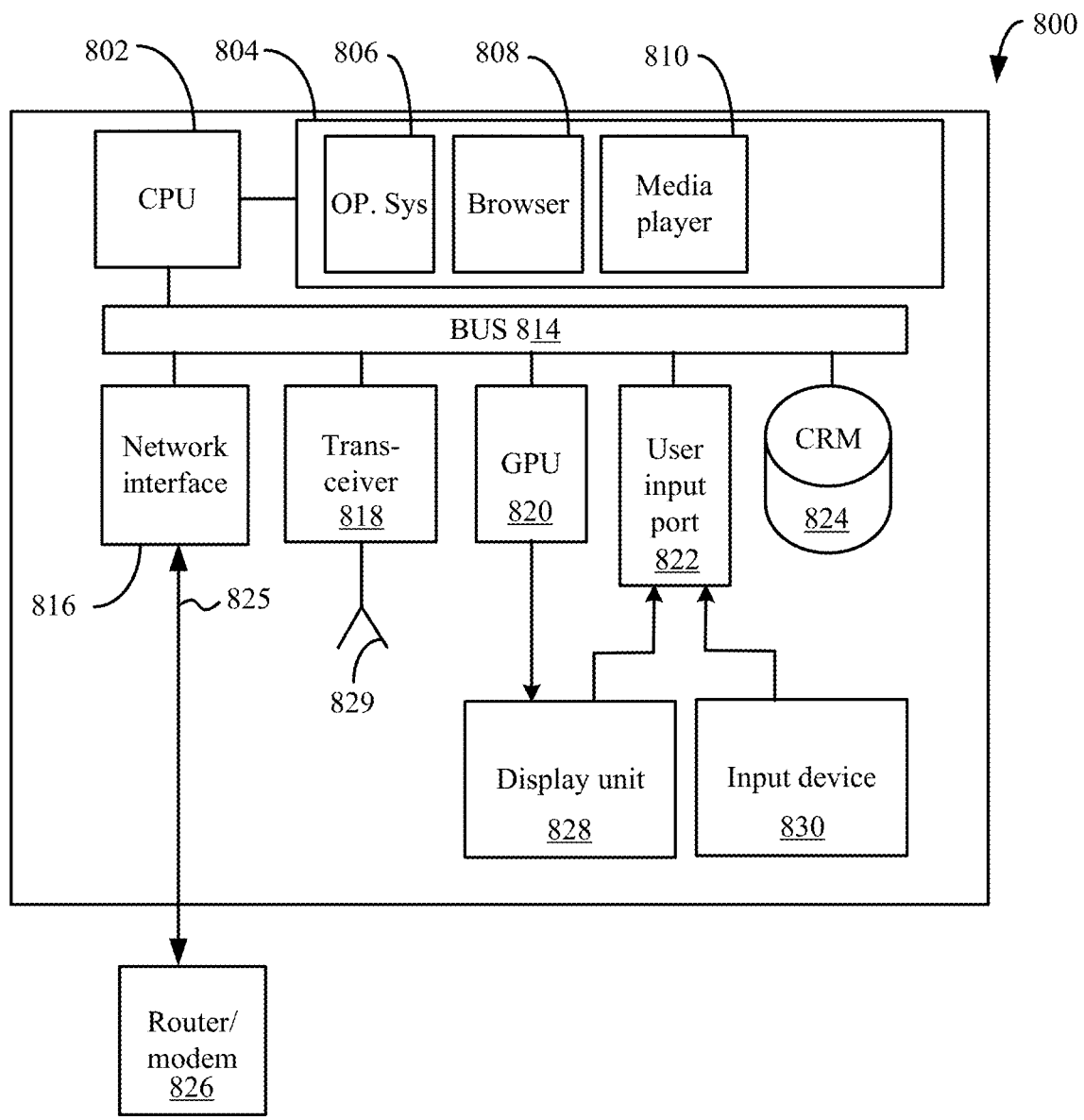
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured or operable to perform particular tasks in accordance with the features and aspects disclosed herein by executing machine-readable software code defining the particular tasks.

Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera, or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a" "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
    receiving, by a computing device, a request for an instance of media content in a current session;
    retrieving, by the computing device, a state for a plurality of content delivery networks that is determined for a session in a set of sessions, wherein:
        the state is determined based on selecting between respective content delivery networks in the plurality of content delivery networks over the set of sessions based on an allocation to distribute processing of requests between content delivery networks,
        the state includes a first set of values for a performance metric, and
        the first set of values is associated with the plurality of content delivery networks;
    determining, by the computing device, a second set of values for the performance metric for the current session, wherein the second set of values is associated with the plurality of content delivery networks; and
    selecting, by the computing device, a content delivery network in the plurality of content delivery networks for the request in the current session based on treating the current session as a session in the set of sessions, and the session for the current session is after the session for the state in the set of sessions, and wherein the selecting is based on optimizing the first set of values from the state and the second set of values from the current session.

2. The method of claim 1, wherein selecting the content delivery network comprises:
    determining a third set of values for the performance metric for the plurality of content delivery networks using the first set of values and the second set of values for respective content delivery networks; and
    using the third set of values to select the content delivery network in the plurality of content delivery networks for the request in the current session.

3. The method of claim 2, wherein determining the third set of values comprises:
    combining a respective first value in the first set of values for a respective content delivery network with a respective second value in the second set of values for the respective content delivery network to generate a respective third value in the third set of values, wherein each content delivery network is associated with a respective third value.

4. The method of claim 3, wherein selecting the content delivery network comprises:
    comparing the respective third values for respective content delivery networks to each other, wherein the content delivery network is selected based on the comparing.

5. The method of claim 4, wherein selecting the content delivery network comprises:
    selecting the content delivery network with an optimal respective third value in the third set of values.

6. The method of claim 1, wherein a first value in the first set of values represents an optimal value for an overall performance metric for the session associated with the state and sessions before the session associated with the state in the set of sessions.

7. The method of claim 1, wherein selecting the content delivery network comprises:
    using the current session as a last session in the set of sessions, wherein the session associated with the state is adjacent to the last session.

8. The method of claim 7, wherein:
a first value in the first set of values represents an optimal value for an overall performance metric for a content delivery network based on the session associated with the state and sessions before the session associated with the state in the set of sessions, and
the allocation is met for selecting respective content delivery networks in the plurality of content delivery networks over the session associated with the state and the sessions before the session associated with the state.

9. The method of claim 1, further comprising:
causing the selected content delivery network to deliver the instance of media content to a client that requested the instance of media content.

10. The method of claim 1, further comprising:
determining an optimal performance for the set of sessions based on the performance metric for the set of sessions; and
storing the state based on the optimal performance for the session associated with the state.

11. The method of claim 10, wherein the optimal performance for selecting between respective content delivery networks in the plurality of content delivery networks over the set of sessions is based on the allocation.

12. The method of claim 11, wherein the allocation specifies a restriction on a number of times a respective content delivery network should be selected to process a request in the set of sessions.

13. The method of claim 10, wherein determining the optimal performance comprises:
determining a plurality of states for different allocations until the allocation is reached, wherein a state in the plurality of states represents an optimal value for the performance metric at a respective allocation.

14. The method of claim 13, wherein the optimal value is an optimized overall value of the performance metric for the respective allocation.

15. The method of claim 1, further comprising:
storing a plurality of states for use in processing multiple requests for instances of media content, wherein states in the plurality of states are based on different sets of sessions.

16. The method of claim 15, wherein different states in the plurality of states are used to select a content delivery network for different requests for instances of media content.

17. The method of claim 15, wherein states in the plurality of states form a loop in which states are iteratively used to process requests for instances of media content.

18. A non-transitory computer-readable storage medium having stored thereon computer executable instructions, which when executed by a computing device, cause the computing device to be operable for:
receiving a request for an instance of media content in a current session;
retrieving a state for a plurality of content delivery networks that is determined for a session in a set of sessions, wherein:
the state is determined based on selecting between respective content delivery networks in the plurality of content delivery networks over the set of sessions based on an allocation to distribute processing of requests between content delivery networks,
the state includes a first set of values for a performance metric, and
the first set of values is associated with the plurality of content delivery networks;
determining a second set of values for the performance metric for the current session, wherein the second set of values is associated with the plurality of content delivery networks; and
selecting a content delivery network in the plurality of content delivery networks for the request in the current session based on treating the current session as a session in the set of sessions, and the session for the current session is after the session for the state in the set of sessions, and wherein the selecting is based on optimizing the first set of values from the state and the second set of values from the current session.

19. The non-transitory computer-readable storage medium of claim 18, wherein selecting the content delivery network comprises:
using the current session as a last session in the set of sessions, wherein the session associated with the state is adjacent to the last session.

20. An apparatus comprising:
one or more computer processors; and
a computer-readable storage medium comprising instructions for controlling the one or more computer processors to be operable for:
receiving a request for an instance of media content in a current session;
retrieving a state for a plurality of content delivery networks that is determined for a session in a set of sessions, wherein:
the state is determined based on selecting between respective content delivery networks in the plurality of content delivery networks over the set of sessions based on an allocation to distribute processing of requests between content delivery networks,
the state includes a first set of values for a performance metric, and
the first set of values is associated with the plurality of content delivery networks;
determining a second set of values for the performance metric for the current session, wherein the second set of values is associated with the plurality of content delivery networks; and
selecting a content delivery network in the plurality of content delivery networks for the request in the current session based on treating the current session as a session in the set of sessions, and the session for the current session is after the session for the state in the set of sessions, and wherein the selecting is based on optimizing the first set of values from the state and the second set of values from the current session.

* * * * *